United States Patent
Marchione et al.

(10) Patent No.: US 10,765,975 B2
(45) Date of Patent: Sep. 8, 2020

(54) FILTER ELEMENT AND METHOD OF MANUFACTURING A FILTER ELEMENT

(71) Applicant: Caterpillar Inc., Peoria, IL (US)

(72) Inventors: Thierry A. Marchione, Heber City, UT (US); Brent D. Widder, Washington, IL (US); Rahul Gami, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 178 days.

(21) Appl. No.: 15/201,299

(22) Filed: Jul. 1, 2016

(65) Prior Publication Data
US 2018/0001236 A1    Jan. 4, 2018

(51) Int. Cl.
*B01D 29/11* (2006.01)
*B01D 39/20* (2006.01)
(Continued)

(52) U.S. Cl.
CPC ............ *B01D 29/111* (2013.01); *B01D 29/31* (2013.01); *B01D 35/005* (2013.01); *B01D 39/2034* (2013.01); *B01D 39/2037* (2013.01); *B22F 3/1055* (2013.01); *B22F 3/11* (2013.01); *B22F 7/06* (2013.01); *B33Y 10/00* (2014.12);
(Continued)

(58) Field of Classification Search
CPC .. B01D 29/111; B01D 29/31; B01D 39/2037; B01D 2201/18; B01D 2239/1208; B01D 35/005; B33Y 80/00; B33Y 10/00; B23K 1/0056; B23K 1/0008
See application file for complete search history.

(56) References Cited

U.S. PATENT DOCUMENTS 3,984,044 A * 10/1976 Breton ................. B01D 39/163
                                                         210/498
4,293,089 A * 10/1981 McCormick ............. B23K 1/20
                                                         228/215
(Continued)

FOREIGN PATENT DOCUMENTS

| CN | 105041529 | 11/2015 | |
| EP | 2156941 | 2/2010 | |
| WO | WO-2014154748 A1 * | 10/2014 | ............. B33Y 10/00 |

OTHER PUBLICATIONS

Rofin. (Nov. 9, 2015). Laser Brazing. Retrieved from https://www.rofin.com/en/applications/laser-soldering-and-brazing/laser-brazing/ (Year: 2015).*

(Continued)

*Primary Examiner* — Liam Royce
(74) *Attorney, Agent, or Firm* — Leydig, Voit & Mayer, LTD.

(57) ABSTRACT

A filter element for the filtration of fluids can be manufactured from powdered metal using a laser manufacturing process. The powdered metal is deposited in a layer on fabrication platform and a laser beam is directed toward the layer of material so that the powdered metal granules fuse together to form a first component of the filter element. Successive layers of powdered metal can be deposited over the first component and also fused with the laser beam to form additional components. During the manufacturing process, the power or scan rate of the laser beam many be changed so that the formed layers of the filter element may have different porosity characteristics, for example, with certain portions being fluid permeable and other portions being fluid impermeable.

10 Claims, 5 Drawing Sheets

(51) Int. Cl.
  *B22F 3/11* (2006.01)
  *B22F 3/105* (2006.01)
  *B22F 7/06* (2006.01)
  *B01D 35/00* (2006.01)
  *B01D 29/31* (2006.01)
  *B33Y 80/00* (2015.01)
  *B33Y 10/00* (2015.01)
  *B23K 1/005* (2006.01)
  *B23K 1/00* (2006.01)

(52) U.S. Cl.
  CPC .......... *B33Y 80/00* (2014.12); *B01D 2201/18* (2013.01); *B01D 2239/1208* (2013.01); *B23K 1/0008* (2013.01); *B23K 1/0056* (2013.01); *Y02P 10/295* (2015.11)

(56) References Cited

U.S. PATENT DOCUMENTS

| | | | | |
|---|---|---|---|---|
| 4,690,320 | A * | 9/1987 | Morishita | B22F 7/002 228/194 |
| 8,727,203 | B2 | 5/2014 | Wang et al. | |
| 2006/0248719 | A1 * | 11/2006 | Szela | B23K 1/0018 29/889.7 |
| 2009/0114625 | A1 * | 5/2009 | Palmquist | B23K 1/0056 219/121.64 |
| 2010/0050580 | A1 * | 3/2010 | Fielding | B01D 39/2034 55/476 |
| 2010/0291286 | A1 | 11/2010 | O'Neill et al. | |
| 2011/0127213 | A1 | 6/2011 | Gennaro et al. | |
| 2014/0301884 | A1 | 10/2014 | Hellestam et al. | |
| 2014/0348692 | A1 | 11/2014 | Bessac et al. | |
| 2015/0064019 | A1 | 3/2015 | Lacy et al. | |
| 2015/0137412 | A1 | 5/2015 | Schalansky | |
| 2015/0283642 | A1 | 10/2015 | Forsdike et al. | |
| 2015/0322800 | A1 | 11/2015 | Crosatti et al. | |
| 2015/0360328 | A1 * | 12/2015 | Li | B23P 6/045 228/119 |
| 2016/0059154 | A1 * | 3/2016 | Fockele | B33Y 10/00 210/243 |

OTHER PUBLICATIONS

Yang-CN-105041529 (machine translation and original attached) (Year: 2015).*

* cited by examiner

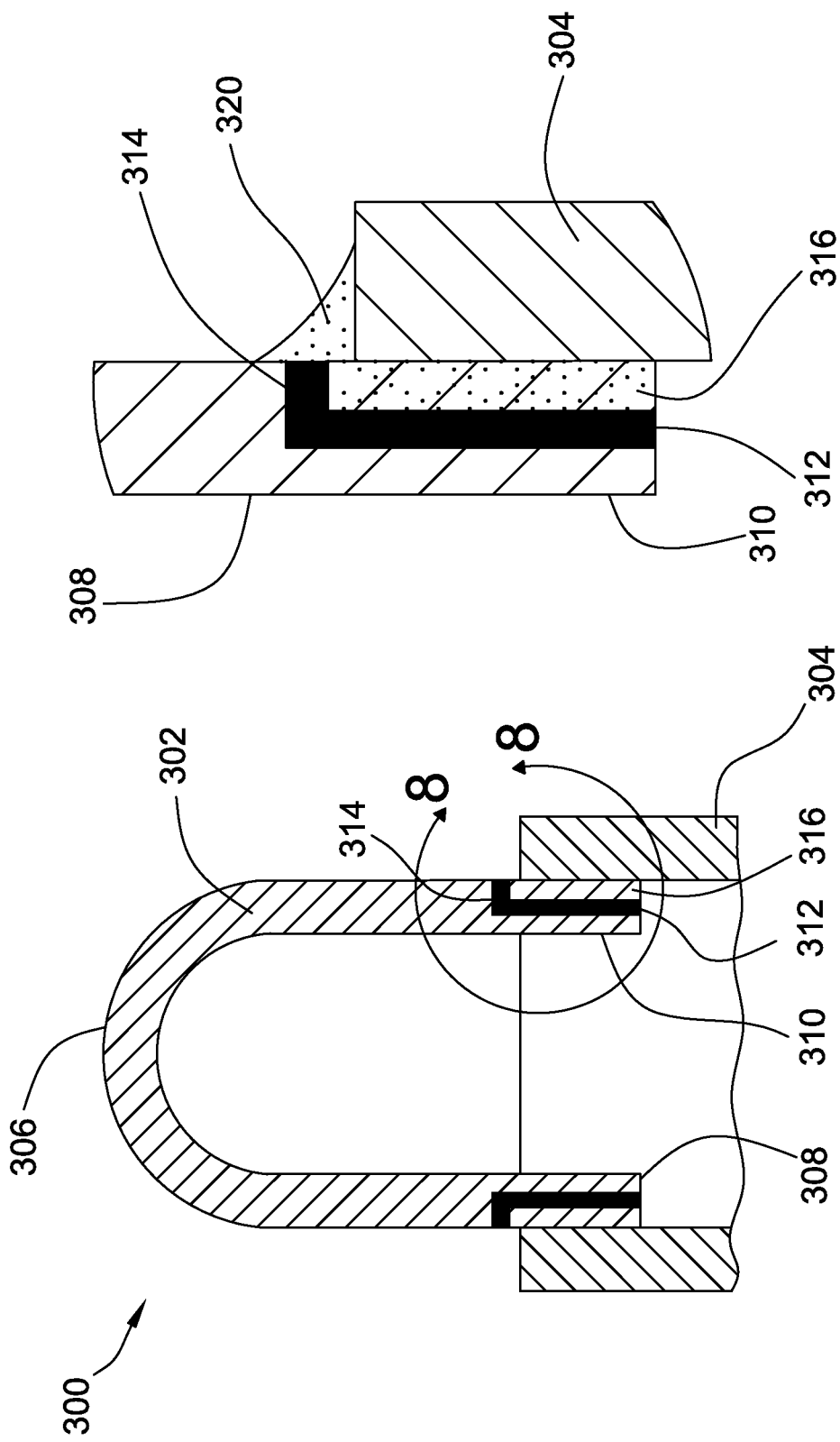

FILTER ELEMENT AND METHOD OF MANUFACTURING A FILTER ELEMENT

TECHNICAL FIELD

This patent disclosure relates generally to a filter element for filtration of fluids, and, more particularly to a method of fabricating a filter with a porous component permeable to fluid flow and a solid component that is impermeable to fluids.

BACKGROUND

Filters are widely used in numerous applications to remove contaminants from liquids and fluids. Examples of filter applications for the filtration of fluids include food and beverage processing, health care applications, and the automotive and powered machine industry in which internal combustion engines combust fuel to produce mechanical power. For example, filters are often utilized as part of the fuel system for an internal combustion engine to filter fuel directed from the tank to the combustion chambers to remove contaminants that could otherwise clog injectors and/or negatively affect the combustion process. In addition to the various applications, filters are available in many different configurations, sizes, and shapes that may depend upon the particular application.

In the automotive or combustion engine sector, however, one often-used filter configuration will include a filtration media that is fluid permeable for filtration of the process fluid and a rigid, impermeable housing in which the filtration media is disposed. The housing may interconnect with or delineate various passages to direct the incoming fluid through the filtration media and back out of the filter. Examples of filtration media may include mated paper, metal meshed screens, porous material, or particle sieves while the material of the housing may be solid metal, glass, or ceramics. To facilitate assembly and positioning of the filtration media within the housing, the filtration media is often configured as a filter cartridge or element that may include some non-permeable or solid components that interface with the housing. The present disclosure is directed to a filter element having fluid permeable and impermeable components and to a method of fabricating the same for such exemplary applications.

SUMMARY

In an aspect, the disclosure describes a filter element manufactured by a laser manufacturing process from powdered metal materials. The filter element includes a first component that corresponds to a filtration media and that has a first porosity permeable to fluid flow. The filter element also includes a second component corresponding to a solid component of the filter element and that has a second porosity which is less than the first porosity and that is impermeable to fluid. The first and second components are manufactured from fused powdered metal and are formed integrally adjacent to each other by a laser beam.

The disclosure describes, in another aspect, a method of fabricating a filter element by first depositing a first layer of powered metal on a fabrication platform of a laser manufacturing machine. A laser beam is directed toward the first layer to form a first component of the filter element by fusing metal particle granules together. The first component may have first porosity. The fabrication platform with the first component disposed thereon is lowered and a second layer of powered metal is deposited over the fabrication platform and the first component. The laser beam is again directed toward the second layer to form a second component of the filter element by fusing metal particle granules together. The second component has a second porosity that is different from the first porosity.

In yet another aspect, the disclosure describes a filter element manufactured by a laser manufacturing process which has a first region with a first porosity that is fluid permeable and a second region with a second porosity that is fluid permeable. The first region and the second region are integrally formed together from powdered metal by a laser beam and the first porosity is different from the second porosity.

BRIEF DESCRIPTION OF THE DRAWINGS

FIG. 7 is a cross-sectional view of another embodiment of a filter element having filtration media with integral regions of different porosities or material densities attached to a housing component.

FIG. 8 is a detailed view of the interface between the filtration media and the housing component taken of area 8-8 in FIG. 7 illustrating a brazing process to join the parts together.

DETAILED DESCRIPTION

Figure 1:
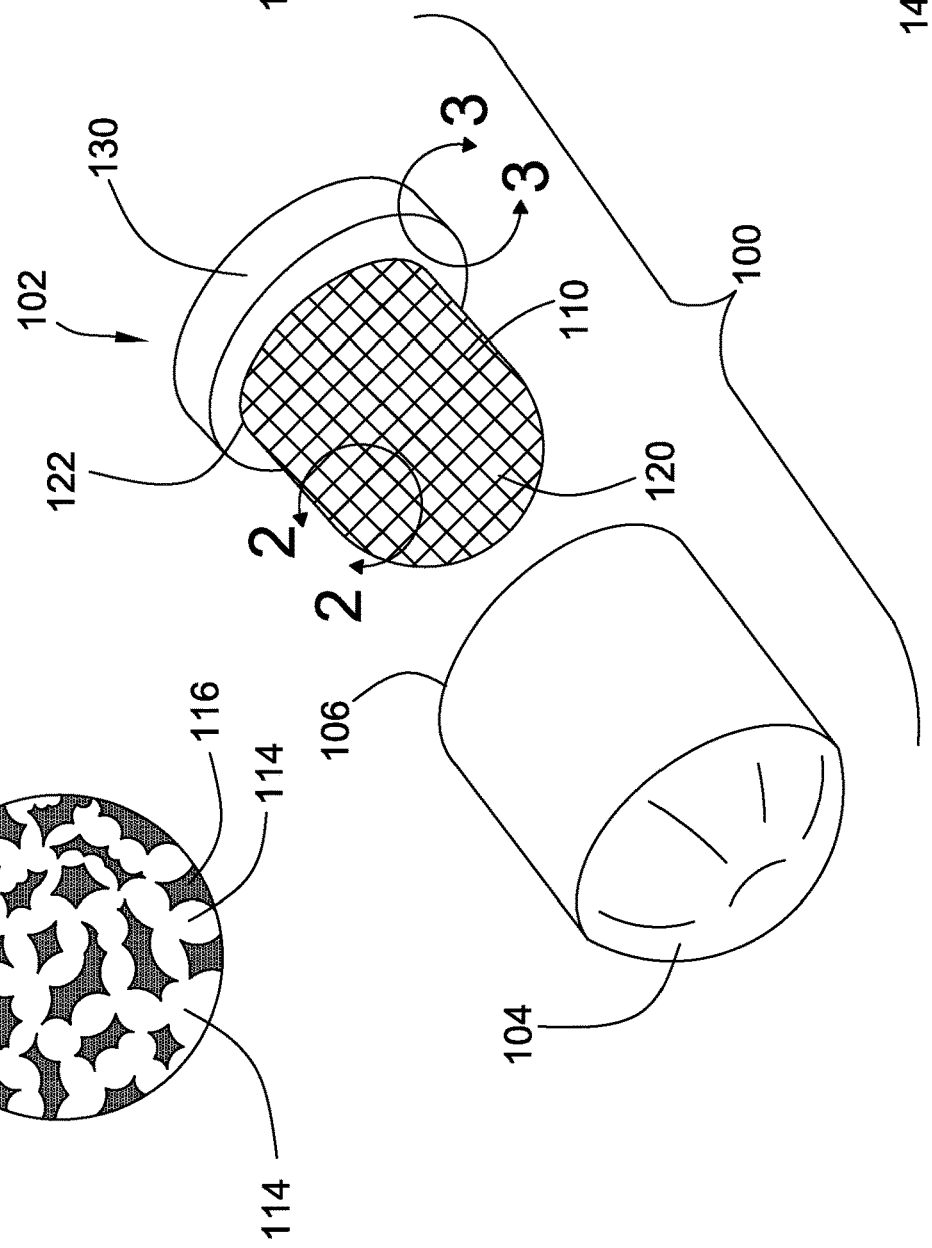
FIG. 1 is a perspective assembly view of a filter assembly including a filter element manufactured from a laser manufacturing process that is disposable inside a canister-shaped filter housing.

This disclosure relates to filters and to methods of fabricating filters to perform the filtration of fluids and the like. Although the filters described herein are particularly intended for use with internal combustion engines in the automotive and mechanical power generation industries, filters and processes according to the disclosure may find application in other suitable fields as well. Referring to FIG. 1, wherein like reference numbers refer to like elements, there is illustrated an example of a filter assembly 100 that may include a filter element 102 that can be disposed inside an external filter housing 104. To enclose the filter element 102, in the illustrated embodiment, the filter housing 104 can be formed as a rigid, hollow structure such as stamped sheet metal, similar to a canister, and can include an opened end 106 into which the filter element is inserted. The filter assembly 100 may be intended for the filtration of any suitable process fluid such as fuel or oil. Hence, in an embodiment, the filter assembly 100 may be configured as a separate item that is disposed in a fuel or oil system and that is located remotely from the engine block of the internal combustion engine. Accordingly, the filter assembly 100 may be sized and dimensioned to have a flow capacity corresponding to the rated fuel consumption of the internal combustion engine. In other embodiments, the filter element 102 may be configured for inclusion inside a fuel injector or the like and accordingly may be much smaller in size.

Figure 2:
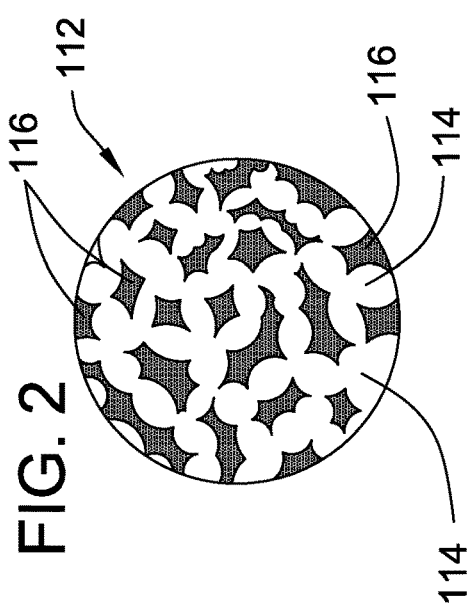
FIG. 2 is a detailed view of the porous metal material that comprises the fluid permeable filtration media of the filter element taken of area 2-2 in FIG. 1.

The filter element 102 may include multiple components or parts that facilitate its function as a filter. For example, to filter the fluid, the filter element 102 may include a permeable filtration media 110 that the fluid is directed through. Referring to FIG. 2, the filtration media 110 may be made of a porous metal material 112 having a plurality of interconnected pores or voids 114, which are unoccupied spaces or pockets within the composite metal material 116. More particularly, the porous metal material 112 may be configured as an opened-celled structure that allows the passage of fluid through the filtration media 110 through the interconnected voids 114 while trapping or capturing particulates and contaminates in the voids. The composite metal material 116 therefore functions as a lattice structure that defines the voids 114. The composite metal material 116 may be configured as substantially isolated congregations of material as isolate, or as described below may be formed spheroids of particle granules joined by point-to-point contacts at their surfaces.

The filtration media 110 may be characterized by having a first porosity of a value that allows for or permits fluid flow through the media. To express or quantize the first porosity of the filtration media 110, the first porosity may be referenced to the void ratio or void density of the filtration media, which may be determined by dividing the volume of the voids by the total volume of the composite metal material 116, for example, according to the following equation:

$$\text{Void Density } (\varepsilon) = V_{voids}/(V_{total} - V_{voids}) \quad \text{[Eqn. 1]}$$

Hence, the void density represents the ratio of empty space to the composite metal material 116 for the filtration media 110 and may represent the difference between the overall volume of the component and the density of the actual metal contained in the component. Another expression for evaluating porosity of a material is by its micron rating. The dimensional size of the individual voids 114 will generally correspond to the size of the particles the filter element 102 can trap or let pass through, and can be expressed in microns as the micron rating of the filter. By way of example, the voids 114 of the porous metal material 112 may be within a range between about 5 micron and about 200 microns. In many embodiments, the voids 114 will have irregular shapes and sizes and the micron rating may be based on the average or mean dimensions of the voids.

The void density, or the volume of the interconnected voids, corresponds to the fluid permeability or impermeability of the material at issue. A more permeable material will have less resistance to fluid flow while a less permeable material will have more resistance. In addition, a more permeable material will weigh or have less mass than a less permeable material, which would include more actual material and fewer voids.

Figure 3:
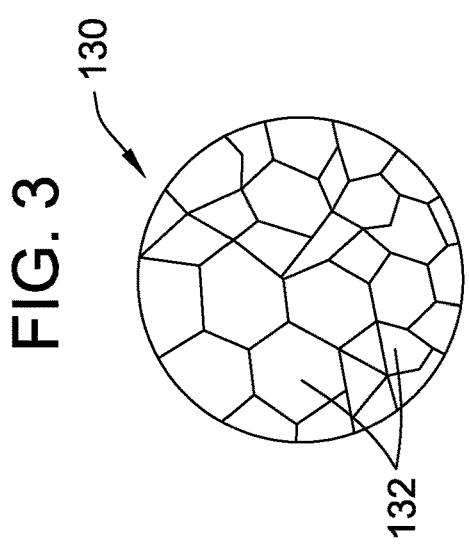
FIG. 3 is a detailed view of integral metallic grains of the fluid impermeable solid component of the filter element taken of area 3-3 in FIG. 1.

Referring to FIG. 1, the filtration media 110 may be a thin-wall structure of material in a three-dimensional configuration. For example, the filtration media 110 may be formed as a cup-shaped or domed-shaped structure having a rounded closed top 120 and an annular opened rim 122 such that the filter element 102 has a hollow interior. When the filter element 102 is enclosed in the housing 104, the filter assembly 100 may be configured so that the flow of fluid is directed from the interior of the filter media 110 out or alternatively from the exterior of filter element 102 inwards. To operatively interact with the rigid housing 104, the filter element 102 may include a relatively solid component 130 disposed adjacently about the opened rim 122 of the porous filtration media 110. In accordance with the embodiments of the disclosure described below, the solid component 130 may be manufactured integrally with the filtration media 110 or may be manufactured separately and attached thereto through a separate process. The solid component 130 may be characterized by a second porosity that is different from the first porosity of the filtration media and that is impermeable to fluids such as liquids or gasses. As indicated in FIG. 3, the solid component 130 can have a microstructure that is comparative void-free and that may be formed as a plurality of adjacently connected metallic crystalline grains 132 in which there is insufficient space to permit fluid flow. The metallic grain 132 may have any suitable shape or size to provide the fluid impermeable, rigid characteristics of the solid component 130.

Referring back to FIG. 1, in an embodiment, the solid component 130 may be configured as a housing collar that is dimensioned to correspond to and be received in the opened end 106 of the housing 104 so that the filtration media 110 is enclosed. Due to the differences between the first and second porosities of the filtration media 110 and the solid component 130, fluid entering the filter assembly 100 will be directed by the impermeable solid component 130 and the solid housing 104 through the permeable media. In various embodiments, the solid component 130 may be connected to the housing 104 by threads, welding, or any suitable metal forming connections.

Figure 4:
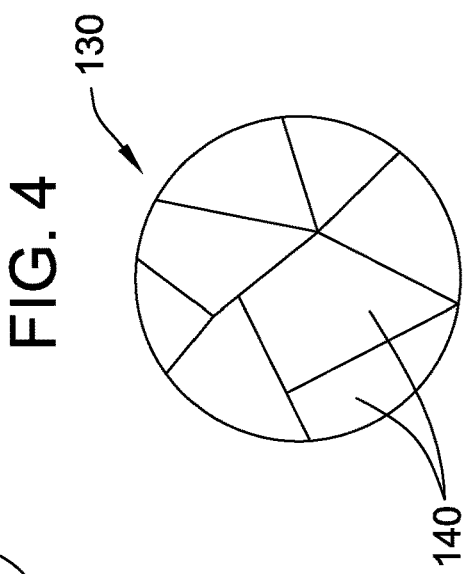
FIG. 4 is a detailed view similar to that of FIG. 3 illustrating integral metallic grains of different sizes or properties within the solid component of the filter element.

Referring to FIG. 4, the solid component 130 may have regions of different sized crystalline grains, for example, the larger grains 140 as illustrated. The larger grains 140 may cause the different regions of the solid component 130 to have different strength or density characteristics including different degrees of porosity. The difference sized grains may be located in successive or adjacent planes of the solid component and, as explained below, may be made by adjusting the laser manufacturing process. The crystalline grains in the different planes may be offset or dislocated with respect to each other.

Figure 5:
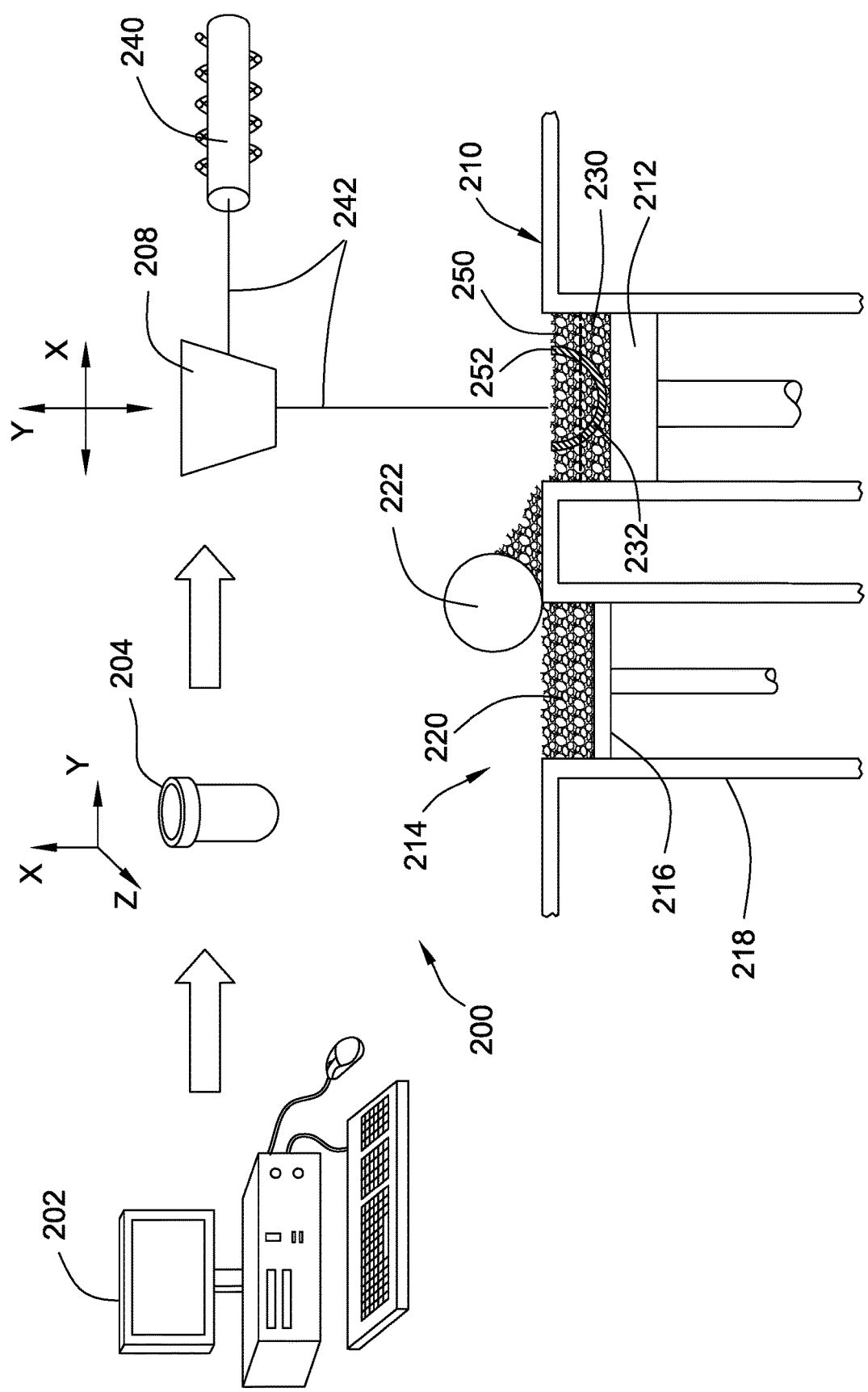
FIG. 5 is a schematic representation of a laser manufacturing machine configured to manufacture filter elements having integral components or regions of different void porosities and/more material densities.
Figure 6:
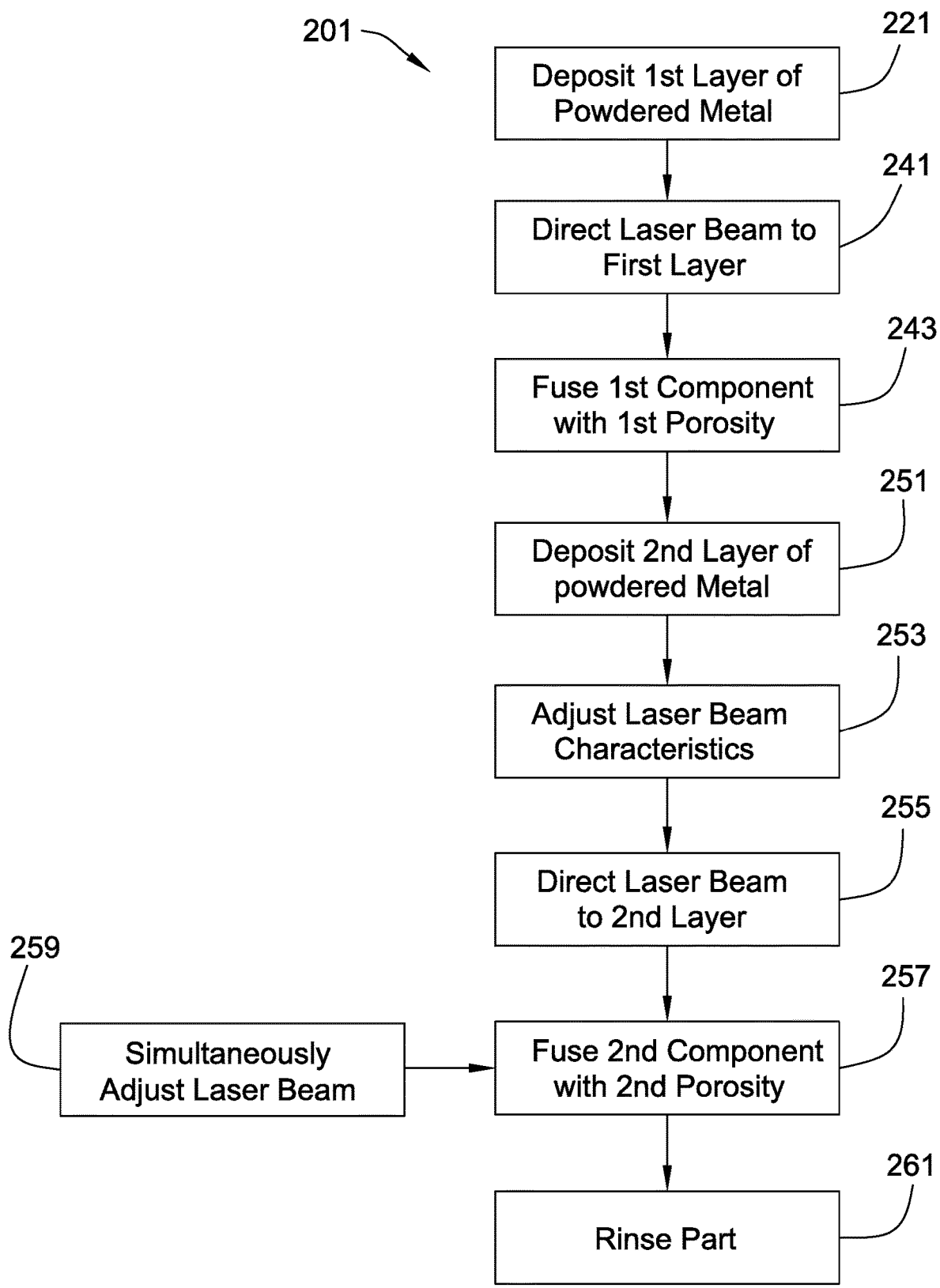
FIG. 6 is an illustrative flow chart of a laser manufacturing process for fabricating a filter element with different porosities.

To manufacture a filter element having different porosities in different components or regions, an additive manufacturing process, in particular, a laser manufacturing process, can be utilized. In a laser manufacturing process, such as sintering laser manufacturing ("SLM"), selective laser sintering ("SLS"), or direct metal laser sintering ("DMLS"), a laser beam is directed to a bed of powdered metal heating the metal granules so they fuse or bond together. Moreover, the laser manufacturing process can be selectively adjusted to produce the varied porosity characteristics of the resulting filter element. Referring to FIGS. 5 and 6, there is illustrated an example of a laser manufacturing machine 200 for conducting the laser manufacturing process 201, though it should be noted that FIGS. 5 and 6 are exemplary only and that modifications to the equipment and steps are contemplated.

The laser manufacturing process 201 may start by using a general purpose or dedicated computer 202 operatively associated with the laser manufacturing machine 200 to generate a digital 3D model 204 in three-dimensional, digital space of the desired filter element. The 3D model 204 can be generated using any suitable computer aided design (CAD) or computer aided manufacturing (CAM) software executable on the computer 202. The 3D model 204 is electronically transferred to a scanner 208 that is disposed over a fabrication platform 210 of the laser manufacturing machine 200 where it can be temporarily stored in memory. The fabrication platform 210 can include a vertically movable fabrication piston 212 that is slidably disposed in a cylinder directly under the scanner 208. To provide the powdered metal, a powdered metal supply system 214 is disposed adjacent to the fabrication piston 212 and can include a vertically movable supply piston 216 similarly disposed in a supply cylinder 218.

The supply piston 216 and supply cylinder 218 may contain a quantity of powdered metal supply 220 in the form of course or fine granules. Examples of suitable powdered metals include but are not limited to stainless steel, irons, copper, aluminum, titanium, cobalt, chromium, and alloys thereof. The granules of the powdered metal supply 220 may also have any suitable particle size and which may in part depend upon the desired porosity of the filter element. To transfer the powdered metal supply 220 to the fabrication piston 212, in a first depositing step 221 of the laser manufacturing process 201, the fabrication platform 210 may include a roller 222 or similar device that pushes a selected portion of the powdered metal supply over to the fabrication piston. The first depositing step 221 results in depositing a first layer 230 of powdered metal on the fabrication piston 212 (visually indicated by the heavy dashed line), which may be smoothed over by the motion of the roller 222. Vertically adjusting the supply piston 216 with respect to the supply cylinder 218 can determine the quantity of the powdered metal supply 220 transferred over, and thus the resulting thickness of the first layer 230.

To solidify a first component 232 within the first layer 230, the laser manufacturing machine 200 can include a laser source 240 which generates a laser beam 242 that is directed to the first layer in a first laser direction step 241 of the laser manufacturing process 201. The laser source 240 can be any suitable type of light source that is capable of producing the laser beam 242 of required power, frequency, coherency, pulse width, and wave length for forming the first component 232. Examples of suitable laser sources 240 can include a fiber laser in which the medium is an optical fiber or similar device, a solid state laser, an yttrium aluminum garnet ("YAG") laser, and a carbon dioxide laser. To align and direct the laser beam 242, the scanner 208 disposed over the fabrication platform 210 may include various optics and lens and may be operatively associated with a multi-axis head that is movable in two coordinates with respect to the fabrication platform. The scanner 208 utilizes the 3D model 204 to manipulate and move the laser beam 242 with respect to the first layer 230 in a manner that traces out a cross-section of the desired filter element.

The energy from the laser beam 242 can heat the powder granules in the powdered metal material of the first layer 230 so they bond together in a first fusing step 243 of the laser manufacturing process 201. In the first fusing step 243, the energy of the laser beam 242 may be such that only the surface the granules melts or is heated to a temperature just above or below the material melting point so that the granules are fused or sintered together by a point-to-point contact without melting the cores. It can be appreciated that with granules of sufficiently coarse or large sizes, the point-to-point contact will provide the first component 232 with a significantly high first porosity or void density such that the first component will be fluid permeable. In other words, there are a sufficient number of interconnected voids that fluid may be directed through the first component 232.

To manufacture additional components of the filter element, additional successive layers of powdered material may be added over the fabrication piston 212. To accomplish this, the fabrication piston 212 can be moved vertically downward with respect to the fabrication platform 210 while the supply piston 216 is moved vertically upwards to present another portion of the powdered metal supply 220 above fabrication platform. The roller 222 moves the powdered metal supply over the fabrication piston 212 and the first component 232 to provide a second layer 250 (visually distinguished from the first layer 230 by the heavy dashed line) in a second depositing step 251. During this time, the energy of the laser beam 242 may be adjusted in an adjustment step 253 before the scanner 208 redirects the laser beam to trace out a successive cross-section of the filter element; for example, by adjusting the cycle time of the scanner motion or by adjusting the power, intensity, or pulse width of the laser beam.

In a second laser direction step 255, the scanner 208 controllably redirects the adjusted laser beam 242 from the laser source 240 toward the second layer 250. The adjusted laser beam 242 may heat the granules in the second layer 250 in a second fusing step 257 to a sufficiently high temperature where they substantially or completely melt and solidify or fuse together to produce the solid second component 252. In an embodiment, the thoroughly melted second layer 250 may reform into a solidified crystalline microstructure with integrally adjacent and contiguous grains, the formation of which may be selectively determined by adjustment of the laser beam 242. Accordingly, the second component 252 may be characterized by a second porosity that is significantly less than the first porosity and that is fluid impermeable. It should be appreciated that the second fusing step 257 also fuses the second component 252 to the first component 232 located below it to form the integral filter element.

Many successive layers of components having different porosities may be added in the foregoing manner. In a another embodiment, the power of the laser beam 242 or the speed that the scanner 208 redirects the laser beam toward the second layer 250 may be adjusted simultaneously during the formation of the second component 252 in a simultaneous adjustment step 259. The simultaneous adjustment step 259 can result in the second component having different porosities within the same plane that is formed are fusing powered material in the second layer 250. Adjustment of the parameters of the laser beam and/or scanner speed or scan time to change to porosity of the component being formed can be accomplished through software control of the laser manufacturing device 200. It should be appreciated that the simultaneous adjustment step 259 may occur during the formation of any of the layers in the filter element. Moreover, the laser manufacturing process 201 may include additional steps to facilitate the development of different porosities such as by use of multiple powdered metal supplies, ambient heating sources, air jets, and the like. Further, while the foregoing process is described as generating integral components having higher porosity/lower material densities first, it should be appreciated the process can be reversed by generating lower porosity/higher material density components first. The laser manufacturing process 201 may include additional finishing steps to improve the filter element, for example, like a subsequent rinsing step 261 as shown in FIG. 5 in which the manufactured filter element is cleansed or rinsed in a liquid slurry to remove any loose powdered metal that may have clung to the filter element. The slurry may include abrasive particles to assist in removing loose powdered material.

INDUSTRIAL APPLICABILITY

Referring to FIGS. 7 and 8, there is illustrated an embodiment of a filter element 300 manufactured by a laser manufacturing process from powdered metal to have areas of different porosity or material density in accordance with the disclosure. The filter element 300 includes a first component that may be configured as filtration media 302 characterized by a first porosity that is permeable to fluid flow and which is attached to a housing component 304 that is a rigid, solid material impermeable to fluid flow. Like the earlier embodiment, the filtration media 302 may be cup-shaped and includes a rounded, closed end 306 and an annular opened rim 308. In the illustrated embodiment, the filtration media 302 and the housing component 304 may be made separately and attached by a brazing process. To facilitate brazing, the opened rim 308 of the filtration media 302 may be manufactured with multiple components or integral zones having different porosities.

For example, the opened rim 308 may include an annular interior 310 having a first porosity similar to the rest of the filtration media 302 and is thus fluid permeable. A second component 312 may be manufactured integrally adjacent to the annular interior 310 by a laser manufacturing process to have a second porosity that is significantly lower than the first porosity and thus is fluid impermeable. In the illustrated embodiment, the second component 312 may be shaped as an L-shaped ring with an overhanging leg 314 that is annularly disposed around the annular interior like an annular collar with the overhanging leg directed radially outward. In other embodiments, the second component 312 may have other shapes such as curved (S-shaped or C-shaped) or may be disposed on an angle with respect to the axial extension of the filter element 300. The opened rim 308 may be manufactured with a third component in the form of an annular exterior 316 that is annularly disposed as a similar annular collar around the annular interior 310 and the second component 312. Hence, the second component 312 is intermediately sandwiched between the annular interior 310 and the annular exterior 316 with the overhanging leg 314 extending radially over and isolating the annular exterior 316. The annular exterior 316 may have a fluid permeable porosity that is different from the second porosity and that may be the same as or different from the first porosity. The different porosities of the first, second and third components can be created by adjusting the power of the laser beam or by adjusting the amount of time which the powdered metal is exposed to the laser beam, which would change the raise in temperature the powdered metal and the characteristics of how the powdered metal fuses into the components of the filter element.

The second component 312 may function as a brazing barrier. Referring to FIG. 8, the opened rim 308 of the filtration media 302 may be slideably inserted into the housing component 304 so that surfaces of the two parts are adjacently disposed. Solid brazing material 320 may be disposed at that interface between the filter media 302 and the housing component 304 and heated by a brazing torch or electrical arc to melt or liquidize. The liquid brazing material may flow into the annular exterior 316 facilitated by the high porosity and corresponding void density. However, further flow of liquefied brazing material 320 into the filtration media 302 is blocked by the fluid impermeable brazing barrier that corresponds to the second component 312. Hence, the annular exterior 316 receives and isolates the liquid brazing material without the brazing material being introduced and filling any of the porous material of the filtration media 302, which could otherwise reduce the capacity of the filter element 300 and result in a pore attachment joint between the filtration media and housing component.

Figure 9:
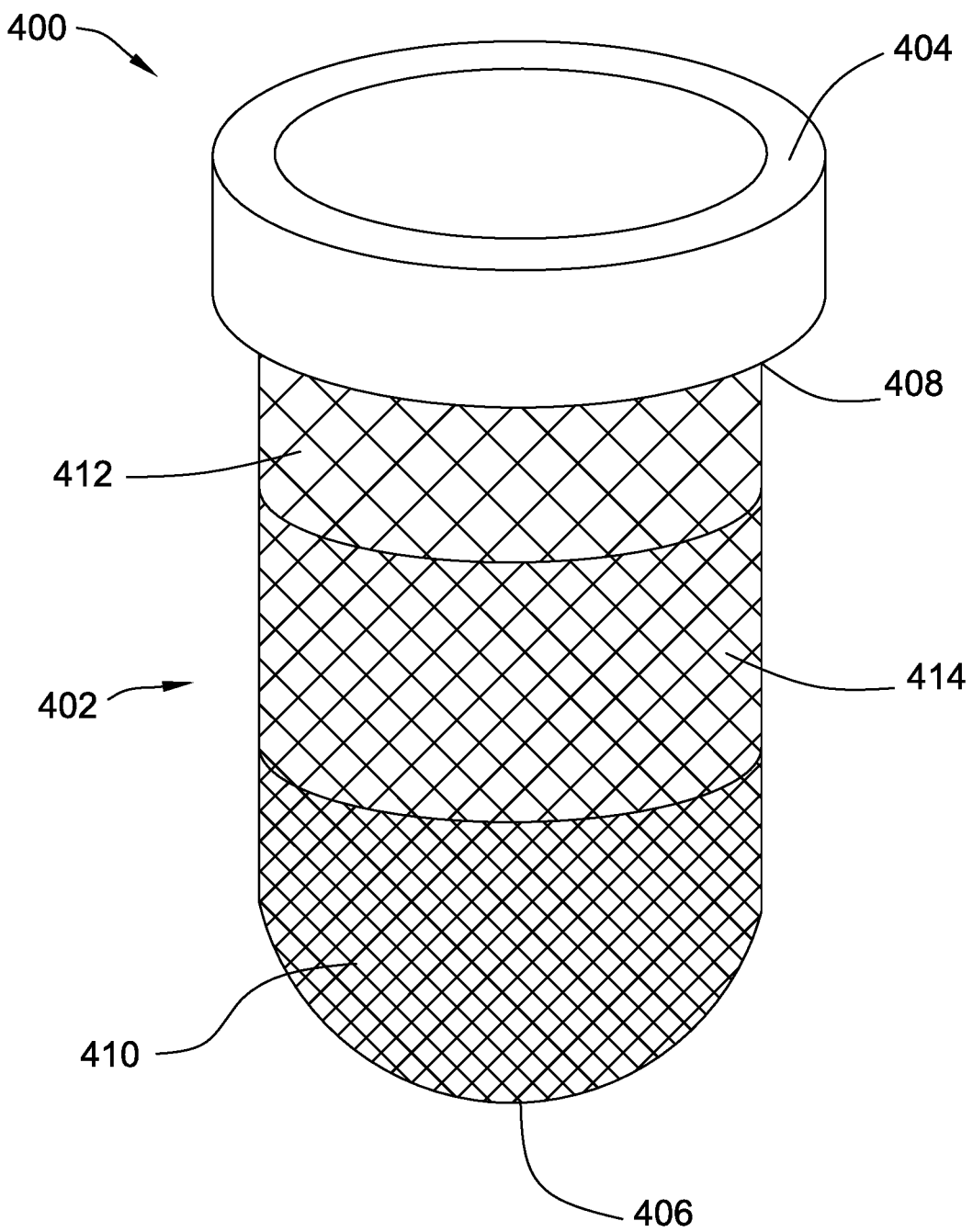
FIG. 9 is another embodiment of a filter element having filtration media with component or regions of different porosity manufactured by a laser manufacturing process.

Referring to FIG. 9, there is illustrated another embodiment of a filter element 400 manufactured by a laser manufacturing process from powdered metal to have integral components or regions of different porosities and thus different permeabilities or resistances to fluid flow. The filter element 400 may be cap-shaped and may include fluid permeable filtration media 402 formed in a tubular, sock-like structure that is joined to a rigid, solid portion 404 to facilitate assembly of the filter element into a housing of a filter assembly. The lengthwise extension of the filtration media 402 may be separated into components or regions of varying fluid permeability. For example, the lower end 410 proximate the rounded closed end 406 may have a first porosity while the upper end 412 proximate the opened rim 408 may have a second porosity greater than the first porosity, as indicated by the hatching. Moreover, the middle region 414 between the lower and upper ends 410, 412 may have a third, intervening porosity between the first and second porosities. The filter element 400 is capable of capturing contaminants of varying or differing sizes from the process fluids for various purposes. For example, the upper end 412 having a higher porosity will be less resistant to fluid flow while the lower end 410 with lower porosity will be more resistant and therefore trap a greater number of particulates in the process fluid. The middle region 414 with an intervening porosity may provide a transition region between the lower and upper ends 410, 412. Further, regions of different porosity may be sharply distinct or may gradually change over the lengthwise extension of the filtration media 402.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A filter element manufactured by a laser manufacturing process, the filter element comprising:
   a first component corresponding to a filtration media and having a first porosity that is permeable to fluid; and
   a second component integral to the first component and corresponding to a preexisting brazing barrier configured to block the flow of a brazing material in a liquid state into the first component, the brazing barrier comprising a solid component of the filter element having a second porosity less than the first porosity and that is impermeable to fluid;
   a solid housing component joined to the first component by brazing material;
   wherein the first component and the brazing barrier are manufactured from powdered metal that is different from the brazing material and are formed integrally adjacent to each other by a laser beam.

2. The filter element of claim 1, further comprising a third component having a third porosity different from the second porosity, the third porosity configured to receive flow of a brazing material.

3. The filter element of claim 2, wherein the filtration media has a cup-like shape with a closed top and an opened rim; the second component is formed as a first annular collar disposed adjacently around the opened rim; and the third component is formed as a second annular collar disposed adjacently around the second component.

4. The filter element of claim 3, wherein the second component include an overhanging leg extending radially over the third component and isolating the third component from the filtration media.

5. The filter element of claim 1, wherein the first porosity of the filtration media is provided by a plurality of interconnected voids.

6. The filter element of claim 5, wherein the first porosity has a range of about 5 microns to about 200 microns.

7. The filter element of claim 1, wherein the powdered metal material is selected from a group consisting of stainless steel, irons, copper, aluminum, titanium, cobalt, chromium, and alloys thereof.

8. The filter element of claim 1, wherein the brazing barrier is disposed at and extends around an annular open rim defining in part a hollow interior of the filtration media.

9. The filter element of claim 8, wherein the brazing barrier is interior of and adjacent to an exterior component disposed at the annular open rim, the exterior component having a porosity greater than the second porosity of the brazing barrier and is configured to receive liquid brazing material.

10. The filter element of claim 9, wherein the brazing barrier is adjacent to an interior component disposed at the annular open rim such that the brazing barrier is sandwiched between the exterior component and the interior component, the interior component having a porosity greater than the second porosity of the brazing barrier.

* * * * *